Sept. 12, 1967   J. W. CROWNOVER   3,340,605
PROCESS OF FORMING A MULTI-APERTURED MAGNETIC DEVICE
Original Filed Jan. 5, 1962   6 Sheets-Sheet 1
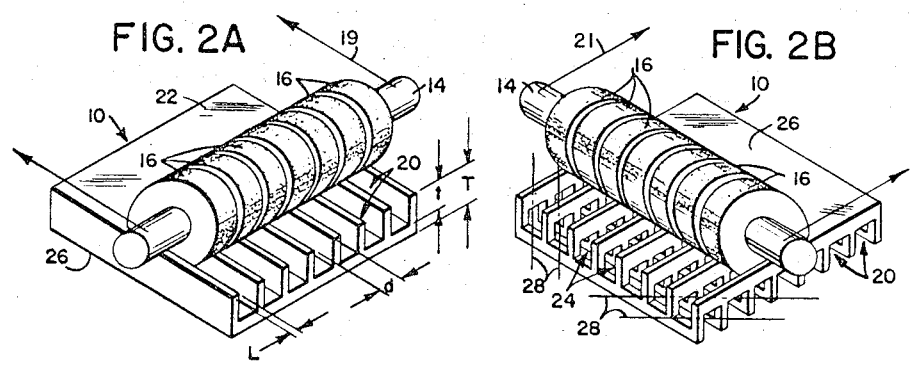
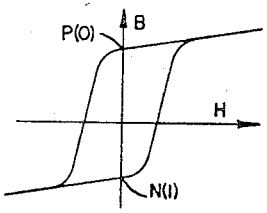
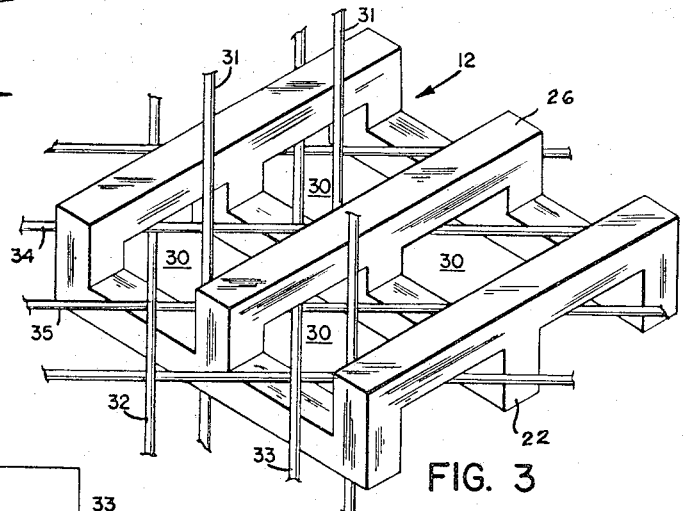
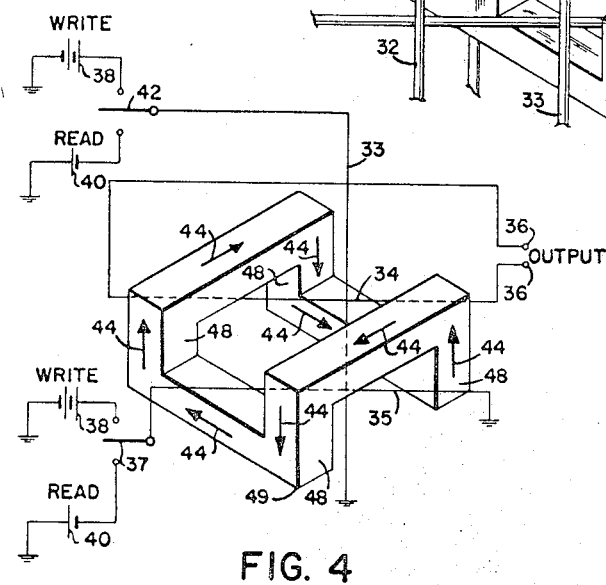
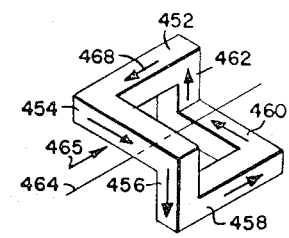
INVENTOR
JOSEPH W. CROWNOVER
BY
ATTORNEYS Sept. 12, 1967      J. W. CROWNOVER      3,340,605

PROCESS OF FORMING A MULTI-APERTURED MAGNETIC DEVICE

Original Filed Jan. 5, 1962      6 Sheets-Sheet 2

INVENTOR
JOSEPH W. CROWNOVER
BY
ATTORNEYS

INVENTOR
JOSEPH W. CROWNOVER
BY
ATTORNEYS

Sept. 12, 1967     J. W. CROWNOVER     3,340,605
PROCESS OF FORMING A MULTI-APERTURED MAGNETIC DEVICE
Original Filed Jan. 5, 1962     6 Sheets-Sheet 4
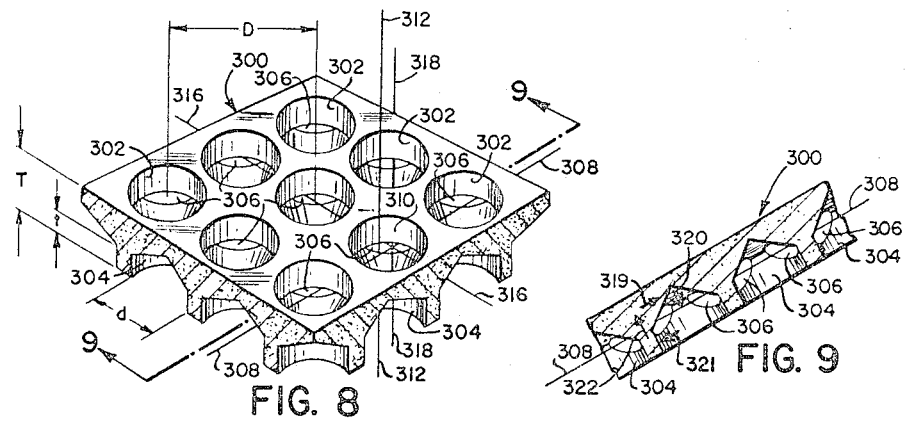
FIG. 8
FIG. 9
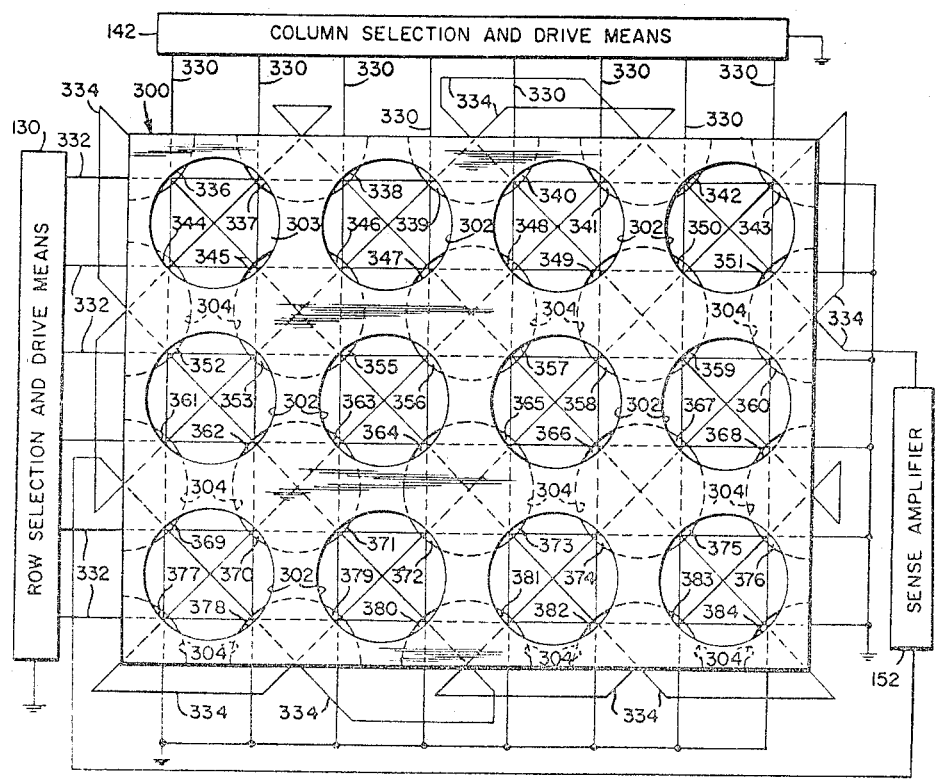
FIG. 10
INVENTOR
JOSEPH W. CROWNOVER
BY
Cushman, Darby & Cushman
ATTORNEYS

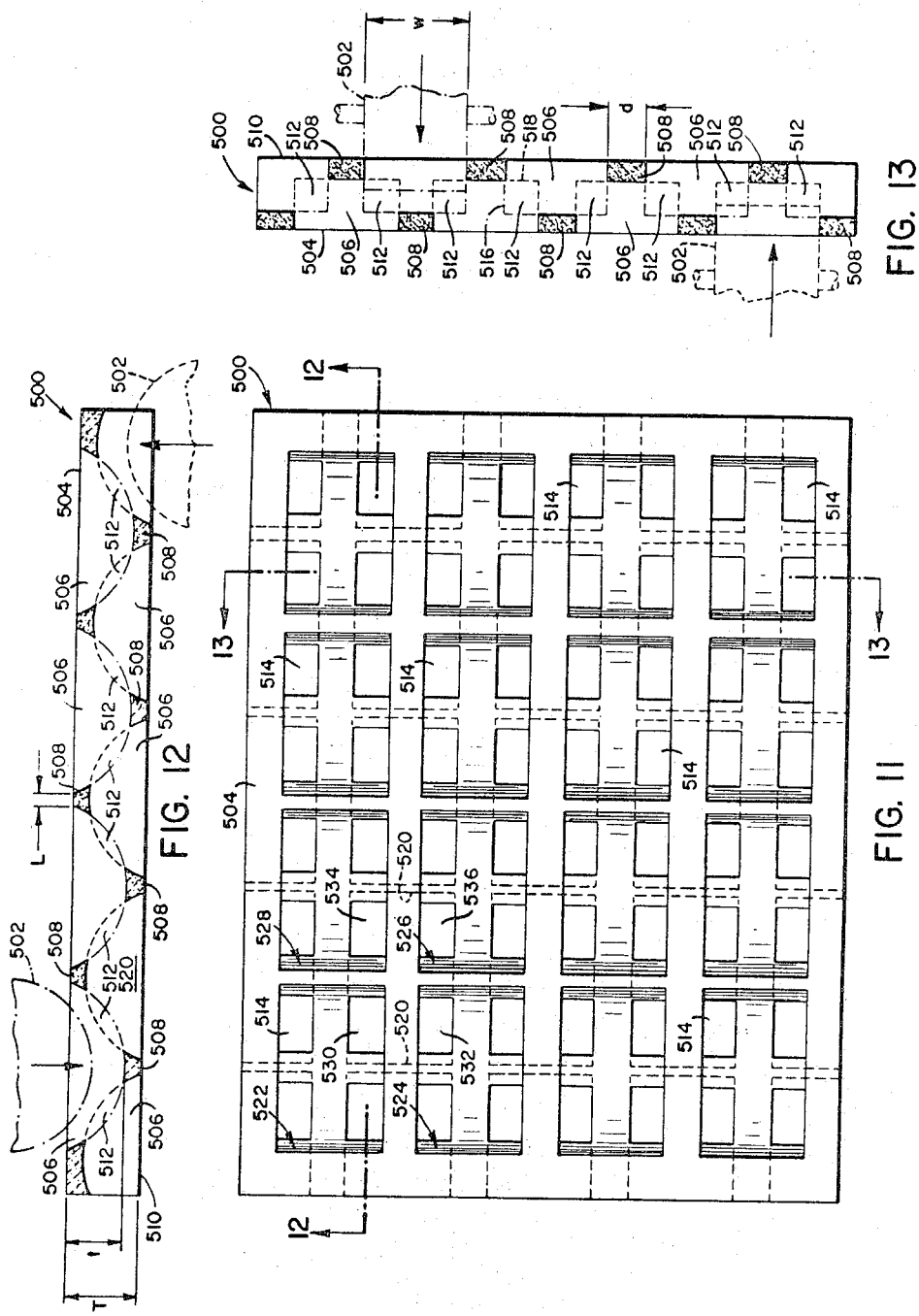

United States Patent Office 3,340,605
Patented Sept. 12, 1967

3,340,605
PROCESS OF FORMING A MULTI-APERTURED MAGNETIC DEVICE
Joseph W. Crownover, La Jolla, Calif., assignor, by mesne assignments, to Control Data Corporation, Minneapolis, Minn., a corporation of Minnesota
Original application Jan. 5, 1962, Ser. No. 164,525. Divided and this application Apr. 10, 1964, Ser. No. 363,321
6 Claims. (Cl. 29—604)

This application is a division of our copending application, Ser. No. 164,525, filed Jan. 5, 1962.

This invention relates to magnetic memory systems and to a novel method for constructing multi-apertured plates that find use in such systems. More particularly, this invention relates to a novel, multi-apertured ferrite plate that permits (1) reductions in the volume and cost of random access memories and (2) the stored information to be non-destructively interrogated. Additionally, this invention relates to discrete, magnetic storage elements capable of being non-destructively read out.

Magnetic memory systems are well known in the art and in the past have taken the general form of an array of discrete magnetic elements, or cores. The magnetic material used for the cores is selected to have a rectangular hysteresis magnetization characteristic such that the cores have two well-defined extremes or states of remanent magnetization. The two states "0" and "1" of a binary information signal may be respectively represented by the positive (P) and negative (N) states of remanent magnetization of the core material. Typical of these present day magnetic memory systems are those described in U.S. Patent No. 2,784,391 issued March 5, 1957 to Rajchman and Endres and U.S. Patent No. 2,889,540 issued June 2, 1959 to Bauer and Haynes. The Bauer et al. patent describes a coincident-current type memory wherein a desired core in a two dimensional array of discrete cores is selected by means of two "half-excitation" select currents. These two select currents are applied through row and column windings which thread the discrete cores. A separate inhibit winding is often used in coincident-current type memories to provide advantages in using a common address for a plurality of stacked arrays.

An additional sense winding linking each of the plurality of discrete cores of an array is employed to read out the stored information by sensing a magnetic flux change in the selected core. In order to sense, or interrogate, a particular core, its remanent state of magnetization is tested by driving the particular core to a predetermined state of magnetic saturation. If the core is already in this predetermined state, a relatively small voltage signal is induced in the sense winding. On the other hand, if the core is not in the predetermined state of remanent magnetization, but is in the opposite state, a relatively large voltage signal is derived. Such readout is said to be destructive in that it destroys the stored information. Additional memory time is required to restore the interrogated core to its original state of remanent magnetization. Aside from the disadvantage of requiring additional time due to their destructive readout characteristics, many conventional magnetic memories are relatively difficult to wire, occupy a relatively large amount of space, and due to loose cores, are somewhat limited in the amount of shock and vibration they can withstand.

Some of these disadvantages have been obviated by memory systems using multi-apertured ferrite plates. One memory system of this type is described in U.S. Patent No. 2,942,240 issued June 21, 1960 to Rajchman and Lo. Unfortunately, the Rajchman et al. plates still are not capable of efficient non-destructive read-out in that they require the use of two or more apertures for each stored bit of information. This is not the most efficient usage of the ferrite material and tends to increase the physical space requirements of the memory.

It is, therefore, an object of this invention to obviate many of the disadvantages of the prior art memory systems.

Multi-apertured ferrite plates may be constructed a number of ways. The classical method includes a molding technique by which the many apertures are formed in the ferrite material during the pelleting stage, prior to vitrification. Such method of forming multi-apertured plates, while adequate, is relatively costly due to (1) the labor involved and (2) the relatively high probability of damage which may occur in the handling of the multi-apertured plates in the so called "green" stage prior to vitrification. Also it is difficult to apply uniform pressure over the entire surface of the apertured plate. Uniform pressure is required to obtain uniformity in the magnetic characteristics of the several apertures, or storage elements, and hence tolerable noise levels during memory operation.

Another object of this invention is to facilitate the construction of novel multi-apertured magnetic plates for use in magnetic memory systems.

Still another object of this invention is to store information in discrete ferrite storage elements that can be non-destructively interrogated.

An additional object of this invention is to provide a novel multi-apertured magnetic plate memory of the coincident-current type, characterized by the non-destructive read-out of the stored information.

A further object of this invention is to store information in a fast random-access, magnetic memory that requires a relatively small amount of space.

In accordance with the invention, a fast, random-access magnetic memory is constructed using novel, multi-apertured ferrite plates formed preferably by one of the several novel methods of this invention. One of these novel methods of making multi-apertured ferrite plates includes the steps of:

(1) Removing material in patterns from the plate by forming a first set of parallel grooves in one of the surfaces of a thin ferrite plate in a given direction, and to a depth substantially equal to half the thickness of the plate;

(2) Removing additional material in patterns from the plate by forming a second set of parallel grooves in the other surface of the plate in a direction perpendicular to the given direction, and to a depth substantially equal to half the thickness of the plate.

By this unique method, an aperture or storage element, is generated in the plate at each of the intersections of the several grooves. The number of apertures, or storage elements, generated by this method is the product of the number of grooves $n$ and $m$ in the respective sides of the plate, such that the number T of generated apertures is the product of $m$ and $n$.

Further, in accordance with this unique method, if each groove is formed to have a width substantially equal to or greater than the width of ferrite material between the grooves (the land), effective sets of holes (or tunnels) are formed in the interior of the ferrite plate. These tunnels all lie in a plane (the tunnel plane) substantially parallel to the surfaces of the plate and make it relatively easy to thread all of the apertures of each plate with wires. Each aperture in the plate may be linked or threaded by a wire through any one of five different paths. One wiring path is through the aperture in a direction perpendicular to the plane of the plate. The remaining four paths lie entirely within the internal tunnel plane. In the tunnel plane two parallel entrances to each aperture exist in orthogonal directions, for a total of four. In accordance with one embodiment of the invention, only the tunnels are utilized to form a two dimensional random-access memory having row and column drive windings as well as sense and inhibit windings.

The novel geometric configuration of the apertures permits them to be interrogated non-destructively by the use of a total select current of insufficient amplitude to change the remanent state of magnetization of the magnetic material surrounding that aperture. If the magnetic material surrounding a given aperture is excited by a "half-excitation" select current, for example, a unique output signal is induced in the sense winding linking that aperture. The output signal has an amplitude that is a function of the remanent state of magnetization of the magnetic material surrounding the selected aperture, i.e., whether it is storing a "0" or a "1."

Further advantages and features of this invention will become apparent from a consideration of the following description read in conjunction with the drawings wherein:

FIGURE 1 is a graphic plot of magnetizing force (H) vs. magnetic flux (B) showing the typical hysteresis loop exhibited by the ferrite material used to form the memory plate illustrated in FIG. 3;

FIGURES 2a and 2b are isometric drawings illustrating the steps of one of the methods of this invention by which a multi-apertured ferrite memory plate having an internal tunnel plane is formed;

FIG. 3 is an isometric view, considerably enlarged, of one embodiment of the multi-apertured ferrite plate of this invention, illustrating the several wiring paths for each aperture;

FIG. 4 is an enlarged isometric view showing an individual storage element of the type formed by each of the apertures of the plate illustrated in FIG. 3;

FIG. 8 is an isometric view of a multi-apertured ferrite plate formed in accordance with another embodiment of this invention;

FIG. 9 is a section view of the plate illustrated in FIG. 8 taken along the line 9—9;

FIG. 10 is a plan view of the plate illustrated in FIG. 8 wired to form a coincident-current type memory;

FIG. 11 is a plan view of still another form of a multi-apertured plate of this invention;

FIG. 12 is an elevation view of the plate illustrated in FIG. 11 showing one method by which the plate is constructed;

FIG. 13 is an end view of the multi-apertured plate illustrated in FIG. 11 showing another of the steps of the method illustrated in FIG. 12;

FIG. 14 is an isometric drawing showing a single aperture of the plate of FIG. 11.

Figure 5:
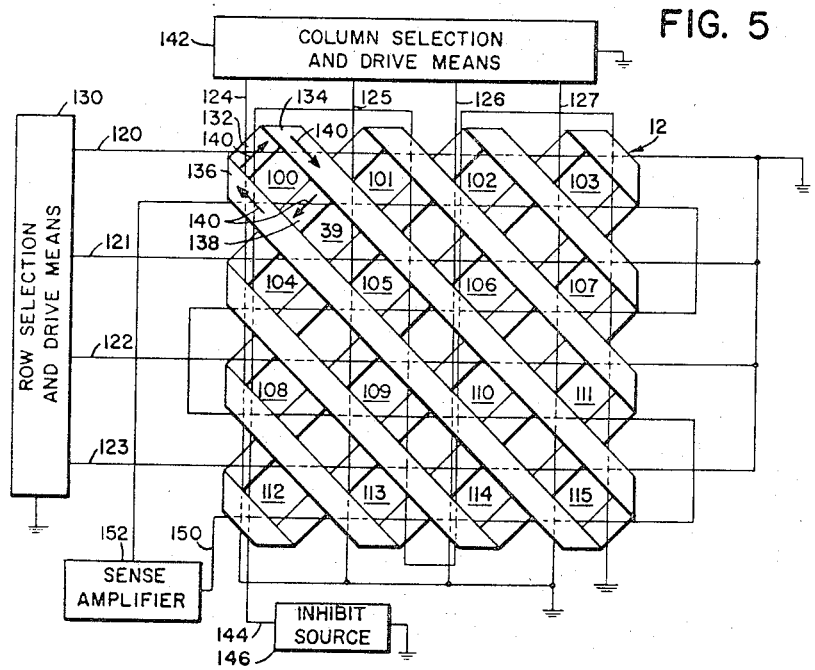
FIG. 5 is a plan view of one form of a two dimensional coincident-current type memory using a multi-apertured plate of the general type illustrated in FIG. 3.

The magnetic material employed in the present invention is characterized by a substantially rectangular magnetic hysteresis loop of the type illustrated in FIG. 1. The term rectangular hysteresis loop is descriptive of the shape of the curve that is derived from the plot in FIG. 1 of the magnetizing force H along a horizontal axis (abscissa) versus the resulting magnetic flux B along a vertical axis (ordinate) for a given sample of magnetic material. Magnetic material exhibiting a substantially rectangular hysteresis loop has the characteristic of having a remanent magnetic saturation or of being substantially magnetically saturated at remanence. In the absence of a magnetizing force, this remanent magnetic saturation may be in a first sense or a second sense opposite to the first sense. These two senses of saturation at remanence are referred to as remanent states. Thus, the intersection P of the upper portion of the hysteresis loop of FIG. 1 with the vertical magnetic flux axis (the point of zero magnetizing force) may be taken to represent the one remanent state (P) and the intersection N of the lower portion of the hysteresis loop with the magnetic flux axis may be taken to represent the opposite remanent state (N). A suitable magnetic material for use with this invention may be a ceramic-like ferromagnetic material such as manganese-magnesium ferrite.

By way of further definition of terms, there are two senses of flux flow around a closed flux path. A positive current flowing into a surface bounded by the path produces a clock-wise flux flow. One remanent state (N), with reference to a closed flux path, is that in which the saturating flux is directed in a clock-wise sense (as viewed from one side of the surface) around the closed path, and the other remanent state (P) is that in which the saturating flux is directed in the counter-clockwise sense (as viewed from the same side of the surface) around the closed path.

Having defined terms, one of the novel methods of forming multi-apertured plates will now be described with reference to FIGS. 2a and 2b. A thin slab or plate 10, of a magnetic material, which exhibits a substantially rectangular hysteresis loop; i.e., has two states of remanent saturation, is selected. The plate 10 is selected to have substantially parallel upper and lower planar surfaces 22 and 26, respectively, such as to have a substantially constant thickness T (defined by such surfaces 22 and 26). In accordance with the invention, apertures are formed in the plate 10 by:

(1) Mounting the plate 10 in a jig (not shown) which movably positions a shaft 14 relative to the upper surface 22 of the plate 10. A plurality of cutting tools, illustrated as diamond cutting wheels 16, are mounted on the shaft 14 at equally spaced positions.

(2) Movably positioning the diamond cutting wheels 16 so as to contact the upper surface 26 of the plate 10.

(3) Adjusting the cutting wheels 16 against the upper surface 22 of the plate 10 to make cuts or grooves therein to a depth $t$ substantially equal to or greater than half the thickness T of the plate 10.

(4) Moving the plate 10 and the diamond wheels 16 relative to each other thereby to form a first set of parallel shallow grooves, or saw cuts 20, in the upper surface 22 of the plate 10.

(5) Rotating the plate 90° in the jig in the plane of the upper surface 22.

(6) Reversing the plate 10 in the jig such that its lower surface 26 contacts the cutting wheels 16.

(7) Adjusting the cutting wheels 16 to form cuts in the lower surface 26 to a depth $t$ substantially equal to or greater than half of the thickness T of the plate 10.

(8) Moving the cutting wheels 16 and the plate 10 relative to each other thereby to form a second set of grooves 24 in the lower surface 26 of the plate 10 that are transverse, or perpendicular to the first set of grooves 20 formed in the upper surface 22 of the plate 10.

There is thus formed a novel multi-apertured plate, or lattice 12, of the type partly illustrated in FIG. 2b and fully illustrated in FIG. 3 wherein the intersections of each of the grooves 20 in the upper surface 22 of the plate 10 with each of the grooves 24 on the lower surface 26 of the plate 10 generates, or forms a plurality of apertures 30 (FIG. 3).

The total number of apertures 30 generated by this method is the product of the number $n$ of grooves 20 and the number $m$ of grooves 24. If the same number of grooves 20 and 24 are formed on each surface of the plate 10, the total number M of generated apertures is given by the formula $M = n^2$.

In an alternative method of this invention, additional sets of interior passageways denoted by the lines 28 (FIG. 2b) may be generated in the plate 10 in addition to the apertures 30. These additional sets of interior passageways 28, hereinafter referred to as tunnels, are generated by forming the grooves 20 and 24, respectively, to have a width $d$ (FIG. 2a) that is substantially equal to or greater than the width L of the "land" portion of the ferrite material between the grooves 20 and 24. The tunnels 28 are generated in the interior portion of the plate 10 and lie in a plane parallel to the upper and lower surfaces 22 and 26, respectively.

The several tunnels 28 lie at an angle of substantially 45° with respect to the orthogonally disposed grooves 20 and 24. This angle will vary if the respective sets of grooves 20 and 24 (1) have different widths $d$, or (2) lie at angles of other than 90° with respect to each other. In any event, with equi-spaced grooves the tunnels 28 bisect the angles between the grooves 20 and 24, respectively. The several tunnels 28 form an effective lateral plane of tunnels which will be referred to herein after as a "tunnel plane." This additional set of holes, or tunnels 28, is clearly visible to the observer if the plate is viewed edgewise from a point at a 45° angle to each of the sets grooves, 20 and 24, respectively.

To repeat, the tunnel plane is formed only if the grooves 20 and 24 are (1) substantially equal to or greater in depth $t$ than half the thickness T of the plate 10 and (2) substantially equal to or greater in width $d$ than the width L of the "land" material between the grooves. If the grooves 20 and 24 are formed to a depth $t$ which exceeds one half the thickness $T$ of the plate 10 by the amount R, wires having a diameter 2R may be fitted to the tunnels 28 formed by this unique method. The depths $t$ of the respective grooves 20 and 24 may vary to accommodate different needs over a considerable range so long as the sum of the depths $t$ of the respective grooves 20 and 24 is substantially equal to or greater than the thickness T of the plate 10.

These methods of forming the apertured plate 12 have a distinct advantage over the prior art molding, or individual drilling techniques. The molding technique, for example, has the disadvantage that the plates are easily damaged in their "green" state prior to vitrification, and, of course, the drilling technique is a somewhat tedious and time consuming method. Additionally, when using a molding technique to form the multi-apertured plates 12, it is relatively difficult to apply uniform pressure over the entire surfaces 22 and 26. Lack of uniform pressure may result in lack of uniformity of the characteristics of the material surrounding the apertures 30 which forms the storage elements. Non uniformity of the several storage elements can result in "noisy" memories.

The geometry of the multiple grooves 20 and 24, respectively, and the resultant tunnels 28 which form the tunnel plane make it quite easy to thread or magnetically link the magnetic material forming each of the several apertures 30. The apertures 30 of the multi-apertured plate 12 may be rapidly wired to form a coincident-current type magnetic memory by threading wires in different configurations through (1) the tunnels 28 or (2) the apertures 30 in a direction perpendicular to the lattice plate 12.

A detailed inspection of the multi-apertured plate 12 reveals that there exist as many as five distinct paths through which wires may thread each aperture 30. The most obvious direction, as illustrated by the wires 31, is directly through the apertured plate 12 in a direction perpendicular to the upper or lower surfaces 22 and 26, respectively. The remaining four wiring directions lie entirely within the tunnel plane. Thus the left hand (in the drawing) aperture 30 may be linked by two parallel wires 32 and 33 which lie in the tunnel plane at an angle of 45° with respect to the grooves 20 and 24 (FIG. 2b). This same left hand aperture 30 also may be linked by two parallel wires 34 and 35 which also lie in the tunnel plane but are at an angle of 45° with respect to the grooves 20 and 24 (FIG. 2b) and at an angle of 90° with respect to the first two wires 33 and 32.

The magnetic material surrounding each aperture 30, may be considered a separate storage element, and may be said to have two parallel entrances in the tunnel plane in two orthogonal directions. The two entrances in each orthogonal direction have an advantage in that the same direction of current flow, depending upon the entrance employed, may drive the magnetic material surrounding the aperture to either the P or N states of remanent magnetization. This advantage is more easily understood by reference to FIG. 4.

The magnetic material forming each of the apertures 30 (FIG. 3) of the apertured plate 12 have the unique ring-like geometric configuration forming a closed magnetic flux path illustrated in FIG. 4; and may be individually molded, if desired, and substituted for conventional magnetic cores in random-access memory arrays. Hence, each of the apertures 30 (FIG. 3) which is used for the storage of information and the discrete elements of the type illustrated in FIG. 4 will hereinafter be referred to an "storage elements". In FIG. 4, the discrete storage element is threaded by three wires 33, 34, and 35, respectively, corresponding to the like numbered wires illustrated in FIG. 3. Two of the wires 35 and 33 may be considered as row and column drive windings, respectively, whereas the third wire 34 may be considered as a sense winding, having an output available at terminals 36.

The row drive winding 35 has one end grounded and the other end connected through a double pole-single throw switch 37 to either the positive terminal of a write current source, illustrated as a battery 38, or the negative terminal of a read current source, illustrated as a battery 40. The remaining terminals of each of the batteries 38 and 40 are connected to ground to complete the circuit. The write current source 38 typically is capable of providing twice the current flow of the read current source 40 so as to permit the non-destructive read-out of the storage element as will be described hereinafter. In like manner, one end of the column drive winding 33 is connected through a double pole-single throw switch 42 to write and read current sources illustrated by the batteries 38 and 40, respectively.

The current available from each of the write current sources 38 is equivalent to or is equal to a half-excitation select current which, using conventional memory techniques, is half of that current required to fully saturate the magnetic material excited by the select current. If, by the way of example, the row switch 37 is connected to the write current source 38, current passes through the winding 35 and establishes a flux in the storage element of FIG. 4 in a clock-wise direction as illustrated by the arrows 44. In like manner, if the column switch 42 is connected to the write current source 38, the current through the column drive winding 33 establishes a flux about the storage element also in a clock-wise direction as illustrated by the arrows 44. If the two half-excitation select currents are simultaneously passed through the row and column drive windings 35 and 33, respectively, the storage element is driven to the N state of magnetic saturation which is used typically to denote a binary "1."

The storage element of FIG. 4 may be destructively sensed using conventional memory techniques by the simultaneous application of two half-excitation read currents through the row and column drive windings 33 and 35. These read currents (being of opposite polarity to the write currents) drive the storage element to the P state of magnetic saturation (FIG. 1). The resulting change of flux in the storage element induces a voltage signal in the sense winding 34. This prior art technique, by its very nature, destroys the information formerly stored in the storage element.

If, for example, the storage element of FIG. 4 were originally in the N remanent state, storing a binary "1," it may be non-destructively sensed in a coincident type arrangement by momentarily connecting the switches 37 and 42 to the read current sources 40. Each of the current sources 40 pass a quarter-excitation select current through the respective row and column drive windings 35 and 33, respectively. This excitation is of insufficient amplitude to vary the remanent state of the storage element. Since the read current from the sources 40 is of opposite polarity to the write current, it produces a counter-clockwise flux in the storage element. This flux change generates a relatively large output voltage in the sense winding 34 which is available at the output terminals 36.

If on the other hand the storage element is in the P remanent state of magnetization, with the flux going in a counter-clockwise direction (opposite that illustrated by the arrows 44), a total read current of "half-excitation" amplitude produces relatively little flux change and a correspondingly small induced voltage in the sense winding 34. This non-destructive read-out property of each of the apertures 30 of the apertured plate 12 (FIG. 3) as typified by the discrete storage element of FIG. 4, is believed to be the result of their unique geometric configuration. As may be observed in FIG. 4, the flux traversing the storage element exists in at least two different directions which are at an angle other than 0° with respect to each other. In the illustration of FIG. 4, for example, magnetic flux exists in at least two different planes, i.e., those formed by the major axes of each of the pairs of the vertical legs 48, and those formed by the major axes of each of the remaining legs. These planes are substantially perpendicular to each other, i.e., the angle between the planes is 90°. Also the geometric configuration is such that the flux existing in the corners, for example the corner 49, is relatively unaffected by the half-excitation currents. This corner flux facilitates the retention of an existing state of magnetization.

The novel storage elements may be utilized either as discrete elements in a coincident-current type array in place of conventional ferrite cores or in a multi-apertured plate memory, several embodiments of which are described hereinafter. A two-dimensional, 16 bit apertured plate memory is illustrated, for example, in FIG. 5. The apertured plate 12 is constructed preferably utilizing the methods illustrated in FIGS. 2a and 2b, the only modification being that the outside edges of the apertured plate 12 are trimmed along lines parallel to the orthogonal sets of tunnels 28 (FIG. 2b) rather than to the grooves. This permits the apertured plate 12 to be wired easily through the tunnels 28 (FIG. 2b) to form a 4 x 4 coincident-current type memory.

To prevent possible interference between adacent apertures, a plate 12 having twenty-five apertures is formed. Preferably, however, only alternate ones of the apertures, which lie in a checkerboard pattern, are used to provide the sixteen storage elements 100 through 115. This checkerboard pattern prevents interference between adjacent storage elements. The effect of this interference may be more easily understood for example, by considering the unused aperture 39. It may be seen that this aperture 31 has one of its legs in common with one of the legs of each of its surrounding useful apertures, or storage elements 100, 101, 104, and 105. If for example, each of the surrounding storage elements 100, 101, 104 and 105 were driven to the P state of saturation and have a counter-clockwise flux flowing therethrough, the magnetic material forming the aperture 39 would be switched to the N state of saturation with a clockwise flux flowing about it, regardless of its prior state of magnetization. Of course, the adjacent element interference is only necessarily true with very thin plates and wide grooves. If large and thicker plates 10 are employed to permit narrow grooves, the adjacent element flux linkages are reduced to the point that every aperture may be used as storage element.

To construct the memory of FIG. 5, individual row drive windings 120 through 123, inclusive, are each threaded through a different row tunnel 28 (FIG. 2b) to link the four storage elements of each row in the same sense. In this instance each storage element 100–115 is linked in what may be termed a negative sense, by using those tunnels used by wire 35 in FIG. 3, by which the row drive windings 120–123 enter each storage element 100–115 by passing over one leg and leave each such element by passing under a leg. With such wiring, a positive-going current drives each element toward the N state of magnetization—hence the element is said to be negatively linked. Conversely, if each of the storage elements 100–115 is threaded by a wire which enters each element by passing under a leg and leaves that element by passing over a leg, that element is said to be positively linked. If a positive current were passed through a wire linking any element in this manner, a counter-clockwise flux is established which drives that element toward the P state of magnetization.

Individual column drive windings 124 through 127, inclusive, are threaded through the proper tunnel to link negatively each different column of storage elements 100 through 123, inclusive. The several row drive windings 120–123 are connected to be individually driven by a row selection and drive means 130. The several column drive windings 124–127 are connected to be individually driven by a column selection and drive means 142.

These linkages perhaps may be more readily understood by considering the first storage element 100, for example. The first row drive winding 120 enters the first element 100 by passing over one leg 132 and leaves the first storage element 100 by passing under the leg 134. In like manner, the first column drive winding 124 enters the first element 100 by passing over the leg 132 and leaves by passing under the leg 136. Assuming a positive current flow through each of the row and column drive windings 120 and 124, respectively, from the respective row and column drive means 130 and 142, a clockwise flux is established in the storage element 100. This flux exists in the several legs 132, 134, 136 and 138 in a direction as denoted by the arrows 140. Thus a coincident-current type memory is formed by utilizing entirely the internal tunnels of the apertured plate 12.

A separate inhibit winding 144 threads each of the storage elements 100 through 115, inclusive, in a direction generally paralleling that of the column drive windings 124 through 127. The difference is that the inhibit winding 144 is threaded through the tunnels of the apertured plate 112 to negatively link each storage element 100–115. Thus the inhibit winding 144 progresses from an inhibit drive source 146 upwardly (in the drawing) through the left-hand entrance of each of the storage elements 112, 108, 104, and 100. Next, the inhibit winding 144 progresses downwardly (in the drawing) through the right-hand entrance of each of the memory elements 101, 105, 109, and 113 that are traversed by the second column drive winding 125. Continuing, the inhibit winding 144 then parallels the third column drive winding 126 by progressing upwardly through the left-hand side of each of the elements 114, 110, 106, 102. Finally the inhibit winding 144 passes downwardly through the right-hand entrance of each of the elements 103, 107, 111, 115 linked by the fourth column winding 127.

An observation of the upper right-hand storage element 103, for example, illustrates that if a positive current to ground is flowing through each of the first column drive winding 127 and the inhibit winding 144, mutually opposing flux tends to be established by each of these windings.

Lastly, a sense winding 150, connected to a conventional sense amplifier 152, is threaded through the tunnels 28 (FIG. 2b) in the apertured plate 12, in any otherwise conventional manner to provide noise cancellation. In the drawing of FIG. 5, the sense winding 150 is illustrated as linking one-half of the storage elements 100–115 in a positive sense and the remaining half of the storage elements in a negative sense. This sense winding arrangement is merely one of several known noise cancellation techniques that can be used. Some noise cancellation scheme is necessary as in magnetic core arrays, because practical magnetic materials do not exhibit perfect rectangular hysteresis loops. This results in the half-selected storage elements, i.e., those linked by the selected row and column windings, inducing a noise voltage in the common sense winding 150. The cumulative effect of the noise voltages may tend to mask the desired output signal.

The row and column selection means 130 and 142, respectively, the inhibit source 146, and the sense amplifier 152 are all well known units in the art. The row and column selection and drive means 130 and 142 each operate in a conventional way to apply coincident pulses to a selected one of the row drive windings 120 through 123 and a selected one of the column drive windings 124 through 127. That storage element lying at the intersection of the selected row and column drive winding is the selected element.

During the write cycle of the memory operation, half amplitude select currents are applied to the selected one of the row and column drive windings such that the selected element lying at the intersection receives a full amplitude excitation current which drives that storage element to the N state of magnetic saturation which then returns to a remanent state corresponding to binary "1." To select the first element 100, for example, the first row and column windings 120 and 124, respectively, are energized. In this instance, those storage elements 101, 102, and 103 lying along the selected row winding and those storage elements 104, 108, and 112 lying along the selected column winding are only partially driven to magnetic saturation and conventionally are referred to as the "half-selected" elements.

Next during the read cycle of the memory, the first storage element 100 may be sensed destructively by applying half-excitation select currents to the first row and column drive windings 120 and 124, respectively. The read currents, of course, are of opposite polarity to the write currents and test the selected storage element by driving it to the P state of magnetic saturation at remanence (the P remanent state). The net output signal is of a relatively large amplitude when the selected storage element 100 is in the N state of magnetic saturation at remanence (the N remanent state) and of a relatively small amplitude when the selected element 100 is already in the P remanent state. The different amplitudes result because the selected element 100 produces a much larger signal in changing from the N remanent state to the P remanent state, as when storing a binary "1," than when the selected element is already in the P remanent state, as when storing a binary "0."

Non-destructive readout of any of the storage elements 100–115 is achieved by reducing the amplitude of the read pulses (as described in conjunction with FIG. 4) such that the total excitation of any storage element is less than that required to switch the magnetic material of the element from one state of magnetic saturation to the other. To interrogate the first element 100, for example, quarter-amplitude select currents are applied to the first row and column drive windings 120, 124, respectively. The selected element 100, which lies at their intersection, receives a total excitation that is half of that required to switch the storage element. Using the novel apertured plate 12 of this invention, such excitation is sufficient to induce an output voltage in the sense winding 150 having an amplitude indicative of the existing state of remanent magnetic saturation of the selected element, i.e., a relatively large amplitude output signal is produced when the interrogated element 100 is storing a binary "1."

The inhibit source 146 functions in its usual manner during the write cycle of the memory to effectively cancel one of the coincident write pulses, namely the column write pulse. The remaining row write pulse alone cannot change the selected memory element from the P to the N state of magnetization. Hence, the writing operation is effectively inhibited. Following each write cycle of the memory, a so-called "post disturb" pulse may be applied to each of the storage elements 100–115. A "post disturb" pulse is advantageous in that it tends to place all of the storage elements 100–115 in a standard remanent state. Any suitable means such as the logic control unit of a digital computer may be used to generate and apply the various signals used in operating the apertured plate memory of FIG. 5. Although the non-destructive read-out feature of this invention was typically described as using quarter-amplitude select currents, other amplitudes may be used depending upon (1) the characteristics of the magnetic material (2) the size of the grooves employed, (3) the thickness of the plate 10, and (4) the spacing between the grooves. The limit upon the amplitude of the select currents employed is determined by the point in the magnetic characteristic of FIG. 1 at which the magnetic material switches from one state of magnetic polarization to the other. The cumulative effect of the two currents in practical cases should be less than the excitation required for the magnetic state of the material to traverse its magnetic characteristic beyond the "knee" of the curve.

Of course, a plurality of the apertured plates 12 may be stacked together in a manner similar to the stacking of present magnetic core arrays to form a three-dimensional memory. The advantages afforded by the subject invention are (1) a closer packing density of storage elements even using alternate apertures, (2) better ability to withstand shock and vibration, and (3) non-destructive read-out of the stored information.

The thickness T of the plates 12 used with this invention should be maintained to a relatively close tolerance so as to maintain the magnetic characteristics of each of the storage elements 101 to 115 substantially the same. The same comment is applicable to the groove widths and the spacing between grooves. It also should be pointed out that because the hysteresis loop of the magnetic material forming each of the storage elements is not perfectly rectangular, some noise will be generated, as in conventional core memories. Also some flux tends to flow around a longer path which may include several apertures. However, the amplitude of the excitation current may easily be limited to that which permits saturation of a given storage element 100–115, but minimizes the flux flow around any longer path than the magnetic material of a given aperture 30. The value of the particular currents employed will vary depending on the thickness T of the plates 12, the width of the grooves and the magnetic material used. Also, if only alternate apertures 30 (FIG. 4) in the apertured plate 12 are used, any interference between adjacent storage elements 100–115 (FIG. 5) due to leakage flux flow around a longer path from an excited storage element is negligible, i.e., the useful storage elements 100–115 are effectively isolated from one another.

Figure 6:
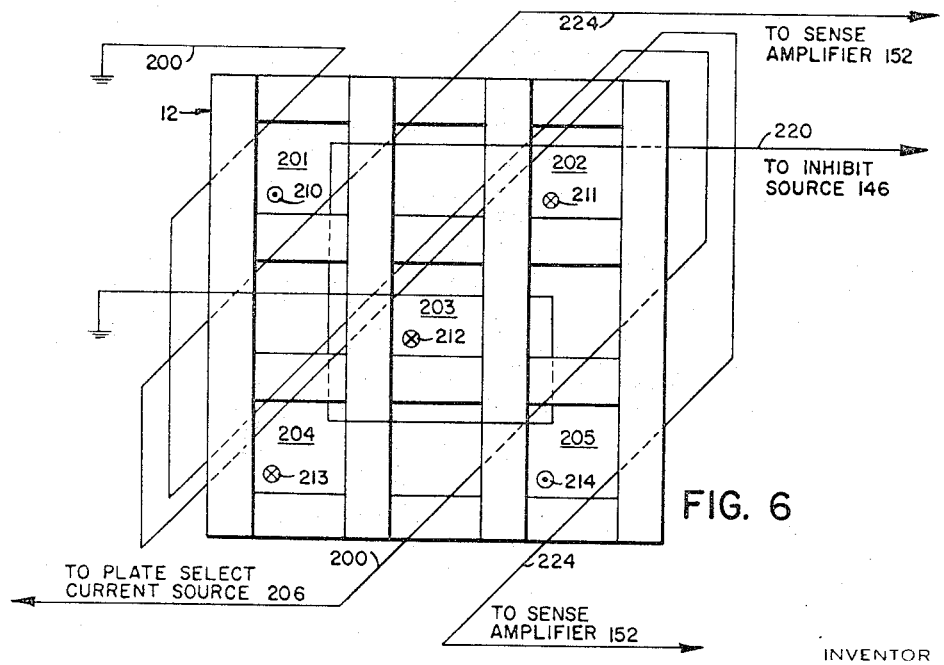
FIG. 6 is a plan view of another form of a two dimensional coincident-current type memory using a multi-apertured plate of the general type illustrated in FIG. 3.
Figure 7:
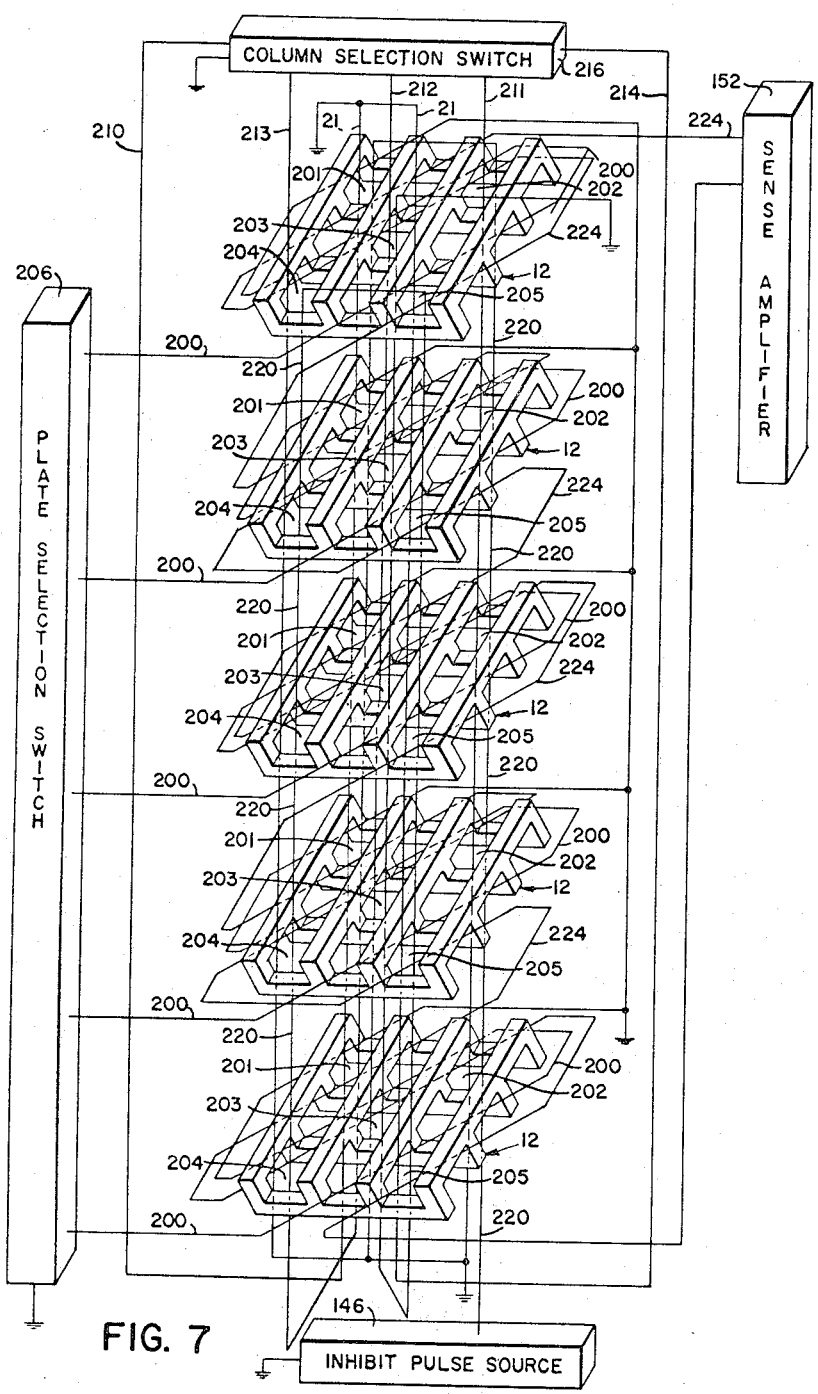
FIG. 7 is a perspective view of a three dimensional coincident-current type memory utilizing a stack of the plates illustrated in FIG. 6.

In FIGS. 6 and 7 there is illustrated still another coincident-current type memory arrangement using the apertured plates 12 of the type illustrated in FIG. 3. FIG. 6 illustrates the details of the wiring of a single plate whereas FIG. 7 illustrates a group of the plates of FIG. 6 stacked together to form a coincident-current memory. In the embodiment of FIGS. 6 and 7, in contrast to the embodiment of FIG. 5, the edges of the plates are trimmed parallel to the grooves. For convenience of drawing, an apertured plate 12 having a 3 x 3 array of nine apertures is illustrated. To prevent interference between adjacent apertures, only alternately spaced apertures are used leaving a total of five storage elements 201–205.

In the embodiment of FIGS. 6 and 7, instead of a given plate 12 facilitating all of the storage elements for one binary bit in a word as is generally true in coincident-current type memories, a stack of plates 12 facilitates one binary bit in a word. To obtain the coincident-current type selection, the number of plates in a stack typically is equal to the number of useful apertures or storage elements in a given plate. Since there are five useful storage elements 201–205 in the plate 12 of FIG. 6, a stack comprises five plates 12 as illustrated in FIG. 7 for a total of twenty-five storage elements.

Because of the relatively low electrical conductivity of the ferrite material each lattice plate 12 may be stacked immediately adjacent another lattice plate with little danger of extraneous circulating currents being established which might destroy stored information.

The details of the wiring for an individual plate of the stack of FIG. 7 are illustrated in FIG. 6. Each plate 12 includes a single plate drive winding 200 continuously threaded through certain of the tunnels 28 (FIG. 2b) of the tunnel plane to link each of the useful apertures or storage elements 201 to 205. More specifically, the plate select winding 200 is threaded in alternate directions through alternate, parallel tunnels 28 (FIG. 2b). Alternate tunnels 28 are used to prevent the unused apertures from being linked twice which would result in their being switched each time the plate drive winding 200 is energized by a half-excitation select current from a suitable current source such as the plate selection switch 206 (FIG. 7). The plate selection switch 206 is the same as the row selection and drive means 130 described in conjunction with FIG. 5. It may be observed that the plate drive winding 200 links the first and fifth storage elements 201 and 205, respectively, in the positive sense and the remaining three storage elements 202, 203, and 204 in the negative sense, i.e., the linkage is such that a positive current flowing from the current source through the plate drive winding 200 establishes a counter clockwise flux in the first and fifth storage elements 201 and 205, and a clockwise magnetic flux in the remaining storage elements 202, 203, and 204.

Five column drive windings 210 to 214, inclusive are threaded through each of the storage elements 201 to 205, inclusive, to link each in the same sense as the plate drive winding 200. The column drive windings 210 through 214, inclusive, are threaded perpendicularly through the plane of the apertured plate 12 and are illustrated by small circles having an $x$ to denote conventional current flow downwardly into the plane of the plate 12 and a dot to denote conventional current flow upwardly out of the plane of the plate 12. Thus the first and fifth apertures 201 and 205 are positively linked by the column drive windings 210 and 214. A positive current passing through the column drive winding 214 of the fifth storage element 205 in the direction indicated, produces a counter-clockwise flux in the fifth storage element 205 as does a positive current flow through the plate drive winding 200 to ground. Similarly the column drive windings 211, 212, and 213 negatively link the second, third, and fourth storage elements 202, 203, 204, respectively.

An inhibit winding 220, which may be connected to a suitable inhibit pulse source 146 (FIGS. 5 and 7), is also threaded perpendicularly to the plane of the plate 12 through the several storage elements 201 through 205 such as to link each storage element oppositely to the manner in which the column drive windings 210–214 link each element. The inhibit winding 220 passes upwardly through the second element 202, downwardly through the first element 201, upwardly through the fourth element 204, downwardly through the fifth element 205, upwardly through the third element 203, and thence to ground to complete the current path to the grounded inhibit current source 146 (FIG. 7).

A sense winding 224, which may be connected to a suitable sense amplifier 152 (FIGS. 5 and 7), is threaded through appropriate tunnels 28 (FIG. 2b) in the internal tunnel plane of the plate 12 (FIG. 6) to link each of the storage elements 201–205. For noise cancellation, the tunnels are selected to link one-half of the storage elements positively and one-half negatively. Normally a single plate 12 would be constructed to have an even number of useful apertures 28 (FIG. 2b) to provide good noise cancellation. For the sake of clarity, however, a plate 12 having only five (an odd number) useful apertures has been illustrated in the drawings of FIGS. 6 and 7. Because of this, the sense winding 224 links three of the storage elements in one sense and two in the opposite sense. The sense winding 224 links the first and fifth storage elements 201 and 205 in one sense and the remaining three storage elements 202, 203, and 204 in a second sense opposite to the first sense. Hence for the illustrative example of FIG. 6 the noise cancellation is not as complete as could be obtained if an even number of storage elements were used.

A plurality of the plates 12 of FIG. 6 may be stacked, with corresponding apertures in alignment, in the manner illustrated in the FIG. 7 to form a twenty-five bit coincident-current type memory. Using the nine-apertured plates 12, each having five storage elements illustrated in FIG. 6, a total of five plates may be stacked to form a 5 x 5 coincident-current type memory. The wiring for the stack is substantially the same as that for the single plate 12 illustrated in FIG. 6, the primary difference being that the column drive windings 210–214 each pass through corresponding aligned storage elements of each plate 12 of the stack rather than only the storage element of a single plate. Thus, second, third, and fourth column drive windings 211, 212, and 213 are threaded from the top to the bottom of the stack, whereas the first and fifth column drive windings 210 and 214, respectively, are threaded from the bottom to the top of the stack. Each of the column drive windings 210–214 is energized by a column selection switch 216 which may be the same as the column selection and drive means 142 of FIG. 5.

Each of the lattice plates 12 is threaded by an individual plate drive winding 200 the same as illustrated in FIG. 6. Each of the plate select windings 200 is connected between a plate selection switch 206 and ground. The plate selection switch may be substantially the same as the row selection and drive means 130 (FIG. 5). Each lattice plate 12 is threaded by an individual sense winding 224 as illustrated in FIG. 6. In the stack illustrated in FIG. 7, the direction of entry of the sense winding 224 into each of the plates 12 is alternated such that with the odd number of storage elements 201–205 (FIG. 6) illustrated, improved noise cancellation is provided. Observation will reveal that by this alternating technique, of the 25 storage elements, thirteen are linked in one direction and 12 are linked in the opposite direction by the sense winding 224. Of course if the plates 12 have an even number of storage elements, such alternation is unnecessary. The sense winding 224 is connected to the sense amplifier 152. Alternatively of course, the sense winding 224 may be threaded through the several storage elements in a conventional checkerboard fashion.

The inhibit winding 220, is wound as illustrated in FIG. 6, the only difference from the illustration of FIG. 6 being that the winding 220 is threaded vertically through the aligned apertures of each of the stacked plates 12 from bottom-to-top, top-to-bottom, etc., to parallel the several column drive windings 210–214, inclusive. The inhibit winding 220 is connected between ground and the inhibit pulse source 146.

The operation of the memory illustrated in FIG. 7 is quite similar to that of conventional coincident-current memories. Access to any given storage element may be had by energizing one plate and one column select winding. If it is desired to select the fifth storage element 205 in the fifth plate 12 (the bottom plate in the drawing) for example, the lower plate drive winding 200 along with the fifth column drive winding 214 are energized. Their currents coincide at the fifth storage element 205 of the lower plate 12 to effect the desired writing, reading, etc. During a read operation, the resulting induced output signal appears in the sense winding 224 which is amplified by the sense amplifier 152 for a computer or other utilization device. The inhibit pulse source 146 functions in a conventional manner during the write operation to prevent information from being stored in the stack illustrated in FIG. 7, for example.

If desired, a plurality of stacks of the type illustrated in FIG. 7 may be employed, one for each binary bit of a computer word. In this instance, the plate drive windings 200 are threaded continuously through correspondingly positioned plates 12 of each of the stacks. In like manner each of the column drive windings 210 through 214, inclusive, are threaded continuously through corresponding columns of storage elements in the several stacks. An individual sense winding 224 is provided for each stack as is an individual inhibit winding 220 provided for each separate stack.

FIGS. 8, 9, and 10 illustrate still another form of apertured plate, having an internal tunnel plane. The apertured plate illustrated in FIGS. 8, 9, and 10 has the advantage of making more efficient utilization of the ferrite material by affording a greater number of storage elements per unit volume and better isolation between elements. The apertured plate 12 of FIG. 10 may be formed from a slab, or plate 300 of ferrite material similar to the slab 10 of FIG. 1. The slab 300 may be molded in the shape illustrated or modified by removing portions of the material in a distinct geometric configuration from both upper and lower faces of the plate 300. Although any known technique may be employed as desired, the portions of material may be removed by techniques such as ultrasonic abrading or by the use of diamond drills.

In a preferred method, the plate 300 has patterns of material removed therefrom by sets of holes or cavities 302 and 304 drilled into both the upper and lower surfaces, respectively, of the plate 300 in orthogonally disposed rows and columns. Each of the holes 302 and 304 are illustrated as being substantially cylindrical in shape, having a diameter $d$ and a depth $t$ (to the conical portion formed by the drill point, for example) substantially equal to or greater than one-half of the thickness T of the plate 300. The spacing D between the holes 302 or 304, on the upper or lower surfaces of the plate 300, as measured along the diagonal, is less than or substantially equal to $2d$. The respective rows and columns of holes 302 in the upper surface of the plate 300 lie substantially between (equi-distant from) adjacent rows and columns of holes 304 in the lower surface of the plate 300. Stated in another manner, a given hole 302 in the upper surface of plate 300 lies equi-distant from the adjacent, or closest, four holes 304 in the lower surface of the plate 300. The individual holes 302 and 304 intersect at their peripheries in the interior of the plate 300. Each such intersection of the holes 302 and 304 forms apertures 306 in the plate 300. Each cavity, or hole 302 or 304, say the first hole 303 in FIG. 10 has four intersections and hence forms four apertures in the plate 300. The magnetic material surrounding the apertures may function as storage elements 336, 337, 344, and 345. The apertures 306 (FIGS. 8 and 9) are orthogonally disposed in rows and columns, and thereby form effective tunnels in the plate 300 of the type described hereinbefore in conjunction with FIG. 2b.

A row of the apertures 306 may perhaps be better viewed in the drawing of FIG. 9, which is a section view of the apertured plate 300 illustrated in FIG. 8 taken along the line 9—9. It may be seen that the several apertures 306 when viewed from the edge of the plate 300 as in FIG. 9, are generally oval in shape due to the line of intersection of the conical portion of the holes 302, 304. If a drill having a straight or flat, as contrasted to a pointed, cutting surface were employed, the apertures 306 would be rectangular when viewed from the edge of the plate 300 as in FIG. 9. The apertures 306 have a size determined by the diameter and the spacing of the holes 302, 304. By reducing the spacing between holes, the size of the apertures 306 may be increased and vice-versa. Also by increasing the diameter of the holes 302, 304, the size of the apertures 306 may be increased and vice-versa.

As illustrated in FIG. 9, the interior tunnel plane is parallel to either of the upper and lower surfaces of the plate 300 and permits the several apertures 306 to be linked by threading wires through the several tunnels. A wire 308, for example, may be threaded through the row tunnel linking the row of apertures 306 (FIG. 9).

A given aperture, may be threaded, as illustrated in FIG. 8 through any one of four paths. These paths are denoted by the four wires 308, 312, 316, and 318. Three of the four wires, namely, 308, 316, and 318 lie in the internal tunnel plane of the plate 300. The fourth wire 312 lies in a direction perpendicular to the surfaces of the plate 300. Thus the wire 308 may be threaded through the internal tunnel plane along one of the row tunnels to link the aperture 310. In like manner another wire 316 may be threaded through the internal tunnel plane along one of the column tunnels to link the aperture 310. The third wire 318, may be threaded along one of the diagonally disposed tunnels in the internal tunnel plane to provide the fourth linkage to the aperture 310.

The flux flow around one of the apertures 306 is denoted in FIG. 9 by the arrows 319, 320, 321, and 322. It may be noted that the flux (represented by the arrows 319 and 321) is parallel to the surfaces of the plate 300 whereas the remaining flux (illustrated by the arrows 320 and 322) is generally perpendicular to the upper and lower surfaces of the plate 300, and hence generally perpendicular to the flux illustrated by the arrows 319 and 321. Stated in another way, little or none of the flux about a given storage element can lie in a single plane, but must exist in at least two planes lying at an angle with respect to each other. This plate construction and resultant flux paths about each aperture tend to facilitate the non-destructive read-out feature of this invention.

A coincident-current type memory constructed using the apertured plate of FIG. 8 is illustrated in FIG. 10. The drawing of FIG. 10 is an 8 x 6 array in which use is made only of the tunnel plane to link the several apertures, each of which may be used as a storage element. Thus in FIG. 10 eight column drive windings 330 are threaded through each of the column tunnels in the plate 300 thereby to link each of the forty-eight apertures, or storage elements 336 to 384, inclusive, in groups six each. The column drive windings 330 each are driven by the column selection and drive means 142 which may be of the same type as described in conjunction of FIG. 5. Each of the storage elements 336–384 lying along each of the rows are linked by respective ones of the row drive windings 332 which are threaded through the row tunnels in the plate 300. The row drive windings 332 are each connected to be driven by a row selection and drive means 130, which may be similar to that described in conjunction with FIG. 5. By energizing a particular column winding 330 and a particular row drive winding 332, the storage element lying at the intersection of that column and row may be selected for read-out or storage of information.

A sense winding 334 is threaded, using the diagonal tunnels formed in the apertured plate 300, through each of the storage elements 336–384 in a conventional checkerboard manner such that half of the storage elements 336–384 are linked in first sense and half are linked in a sense opposite to the first sense. This known technique provides effective cancellation of the noise generated by those storage elements lying along a selected row and column when excited by the half excitation select current. These storage elements as described hereinbefore are known in the art as "half-selected" elements.

The sense winding 334 passes from the sense amplifier 152 in the diagonal tunnels upwardly through the storage elements 351 and 342, then downwardly through the storage elements 340, 349, 359, 368, then downwardly through the storage elements 376, 383, thence upwardly through the storage elements 381, 374, 367, and 360 thence downwardly through the storage elements 343, 350, 358, 365, 372, and 379, thence upwardly again through the storage elements 377, 370, 363, 356, 348, and 341 thence downwardly through the storage elements 339, 346, 353, and 361, thence upwardly through the storage elements 344 and 337, thence downwardly and to the right through the storage elements 338, 347, 357, 366, 375, and 384, thence upwardly through the storage 382, 373, 364, 355, 345, and 336, thence downwardly through the storage elements 352, 362, 371 and 380, thence upwardly through the storage elements 378 and 369 back to the sense amplifier 152. If desired, an inhibit winding may also be employed and may be threaded along either the row or column tunnels of the plate 300 paralleling either the column drive windings 330 or the row drive windings 332, but linking each of the several apertures 336 through 384, inclusive, oppositely to the manner in which they are linked by the row and column drive windings 330, 332.

The apertured plate arrangement illustrated in FIG. 10 has many of the same advantages as the apertured plates described hereinbefore. It may be utilized, for example, in either destructive or non-destructive coincident-current type memories. Other wiring arrangements than that illustrated in FIG. 10, of course, may be employed using the internal tunnels of the apertured plate 300. A major advantage of the apertured plate 300 of FIG. 10 over those previously described is that all apertures are useable rather than half of the apertures as illustrated in the arrangements of FIGS. 5 and 6. Also, the magnetic material between adjacent apertures 306 is of sufficient volume to minimize interference.

Still another embodiment of the invention results if the apertured plate 300 shown in FIG. 10 is modified slightly by forming generally rectangular-shaped apertures 514 in the plate 500 as illustrated in FIGS. 11, 12, and 13. These apertures may be formed by cutting a ferrite plate 10 (FIG. 2a) with a diamond saw or ultrasonic abrading techniques or by molding. To form the apertures 514 illustrated in the plan view of FIG. 11 by cutting, a diamond saw 502 (seen in the elevation and side views of FIGS. 12 and 13) is adjusted against first the upper and then the lower surfaces 504 and 510, respectively, of the plate 500 to form trough-shaped holes or cavities 506. The troughs or cavities 506 are formed in rows and columns on both the upper and lower surfaces 504, 510, respectively, in substantially the same configuration employed in the apertured plate of FIG. 10.

The troughs 506 formed in the upper surface 504 are displaced from those formed in the lower surface 510. Each trough 506 in the lower surface 510 lies substantially equidistant from those four immediately adjacent troughs 506 in the upper surface 504.

The troughs 506 are all formed to a maximum depth $t$ which is substantially equal to or greater than $T/2$ but less than $T$ where $T$ is the thickness of the plate 500. The troughs 506 are spaced apart along the dimension in the plane of the cutting wheel 502, to provide a land area 508 having the width L. The width L is determined by the thickness $T$ of the plate 500 and is selected such that the cutting wheel 502, when applied to both the upper surface 504 and the lower surface 510 of the plate 500, forms troughs 506 which intersect in the areas 512, thereby to form rectangular apertures 514 (FIG. 11) in the plate 500.

The troughs 506 are spaced apart in a direction perpendicular to the plane of the cutting wheel (see FIG. 13) by an amount $d$ determined by the width $w$ of the cutting wheel 502. As seen in the end view of FIG. 13, the land areas 508 each have a width $d$ which is less than the thickness $w$ of the cutting wheel 502. This dimensioning permits the troughs 506 to intersect as illustrated by the intersecting lines 516 and 518, thereby to form the apertures 514 (FIG. 11) and an effective tunnel plane linking the several apertures. The troughs 506, formed in the plate 500 on the upper and lower surfaces 504 and 510, respectively, are displaced with respect to each other, in the same manner as the holes of FIG. 10. The center of the trough 520 (FIGS. 11 and 12), for example, formed in the lower surface 510 of the plate 500 is equidistant between the four troughs 522, 524, 526 and 528 (FIG. 11) that are formed in the upper surface 504. The intersection of the trough 520 (FIG. 12) with the troughs 522, 524, 526, and 528, forms four apertures 530, 532, 534, and 536 in the plate 500. The magnetic material surrounding each aperture may be used as an individual storage element as described in conjunction with FIG. 10.

Rather than using the trough cutting technique illustrated in FIGS. 11 through 13, inclusive, the apertured plate 500 of FIG. 11 may be formed by the use of a mold to mold the ferrite material in its "green" state prior to vitrification, as was discussed previously. Using a mold, each of the troughs 506 might well be in the shape of a rectangular parallelepiped. In this event, the walls of each of the apertures 514 would be vertical, or perpendicular to the upper and lower surfaces 504 and 510, respectively, of the plate 500. Each aperture 514 and the ferrite material forming each aperture would then have the configuration illustrated in FIG. 14. Alternatively, ultrasonic abrading techniques may be used advantageously to form the rectangular parallelepiped-shaped troughs.

The individual aperture illustrated in FIG. 14 may be molded as a discrete storage element to be substituted for a core in a conventional magnetic core memory. The discrete storage element illustrated in FIG. 14 has all the properties of the ordinary magnetic cores with the additional feature of providing non-destructive read-out, as described in conjunction with FIG. 4, due to its unique geometric configuration. The unique configuration is such as to permit the magnetic flux to exist in two separate planes lying at an angle of other than 0° with respect to each other.

Referring to FIG. 14 it is noted that the storage element has six legs 452–462, each substantially perpendicular to its adjoining legs. For example, the leg 452 is perpendicular to its adjoining legs 454 and 462. With this unique configuration, if the ferrite material is excited by a current passing through the wire 464 in the direction of the arrow 465, a counter-clockwise flux (denoted by the arrows) about the storage element is established in the several legs 452 through 462, inclusive. As was the case for the single storage element illustrated in FIG. 4, the element (FIG. 14) is capable of being non-destructively interrogated. Such read-out is achieved by selecting a read current amplitude less than that which will reverse the remanent state of the storage element.

When the single element of the general shape illustrated in FIG. 14 is part of an apertured plate 500, as illustrated in FIG. 11, it may be noted that there is sufficient magnetic material surrounding each aperture or storage element, say element 530, such that flux established about the adjacent apertures 532, 534, or 536 causes little or no interference. The magnetic material forming aperture 514 in the apertured plate 500 therefore, may function as a useful storage element, having four distinct entrances as described in conjunction with the embodiment of FIG. 10. Three entrances are within the tunnel plane; the fourth is perpendicular to the tunnel plane.

These storage elements may be wired using the internal tunnel plane to form a coincident-current type memory. Although there are many ways in which the apertured plate 500 of FIG. 11 may be wired to form such a memory, one suitable wiring arrangement is illustrated in FIG. 15.

Figure 15:
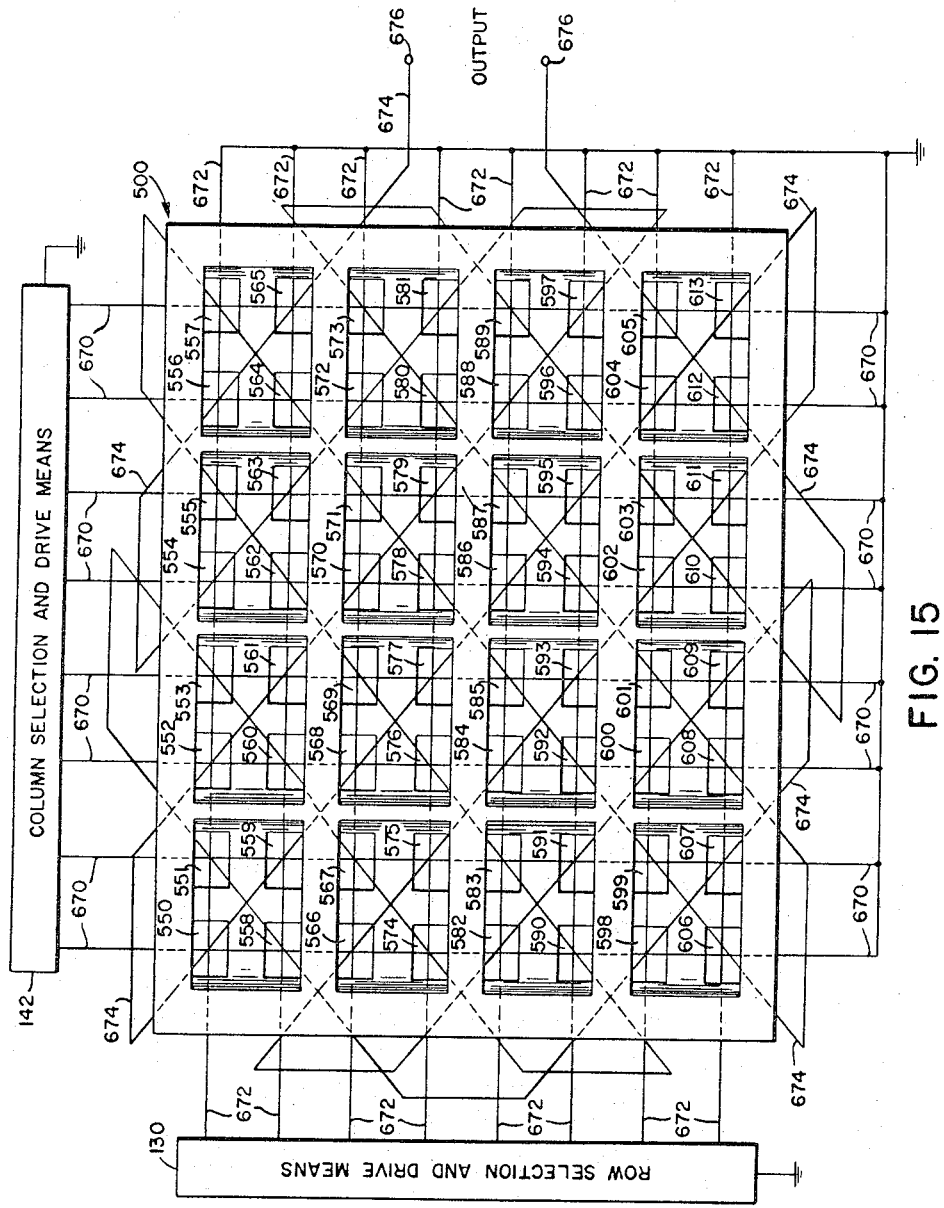
FIG. 15 shows the multi-apertured plate of FIG. 11, wired to form a coincident-current type memory.

In FIG. 15, there is illustrated an 8 x 8 array of storage elements 540 to 613, inclusive, storing 64 binary bits of information. To wire the plate 500, eight column drive windings 670 are threaded through individual column tunnels of the internal tunnel plane of the apertured plate 500, so as to link respective columns of eight storage elements 550 through 613, inclusive. The column drive windings 670 are driven by the column selection and drive means 142. In like manner eight row drive windings 672 are threaded through the row tunnels of the plate 500 to link the respective ones of the storage elements 550 through 613, inclusive, that lie in rows. The row drive windings 672 are connected to be driven by the row selection and drive means 130. Thus by conventional coincident-current techniques, which are well-known in the art and which have been described hereinbefore, any one of the storage elements 550 through 613 may be selected by the application of a select current to that one of the column drive windings 670 and that one of the row drive windings 672 which intersect at the desired storage element.

A sense winding 674, may also be threaded through the diagonal tunnels in a conventional checkerboard wiring configuration of the type described in conjunction with FIG. 10, to link the several storage elements 550 through 613. The sense winding 674 is connected to a pair of output terminals 676, for application to a suitable sense amplifier or other utilization apparatus. The sense winding 674 is threaded from the upper output terminal 676, using only the diagonal tunnels, upwardly through the storage elements 565, 556, thence downwardly through the storage elements 554, 563, 572, and 581. The sense winding 674 continues in sequence along the diagonal tunnels to thread the elements 597, 588, 579, 570, 561, 552, 550, 559, 568, 577, 586, 595, 604, 613, 611, 602, 593, 584, 575, 566, 582, 591, 600, 609, 607, 598, 558, 551, 553, 560, 567, 574, 590, 583, 576, 569, 562, 555, 557, 564, 571, 578, 585, 592, 599, 606, 608, 601, 594, 587, 580, 573, 589, 596, 603, 610, 612, and 605, thence to the remaining output terminal 676. Inhibit windings may be threaded as desired through selected tunnels of the tunnel plane, to function in an otherwise conventional manner.

The apertured plates of this invention can be used in a "word organized" fashion. This involves the use of a combination of drivers and switches that will select a row of apertures or storage elements in geometric register with a full-select read current. The advantage of a configuration such as this is that under extreme environmental conditions such as high temperature, the read current does not have to be constant over the entire temperature range. The input, output, and address circuitry in this case is generally the same as that used in coincident-current type memories.

There has thus been described a novel magnetic memory structure and system that permits the non-destructive read-out of stored information. Also disclosed is a novel method of constructing multi-apertured plates having internal tunnel planes which permit the apertures of the plates to be uniquely wired using the tunnels of the tunnel plane. These multi-apertured plates afford reduction in the volume and cost of random-access memories and are more capable of withstanding vibration and shock than conventional core arrays.

Since many changes could be made in the above described methods and constructions and many apparently widely different embodiments and techniques of this invention could be made without departing from the scope thereof, it is intended that all matter contained in the above description or shown in the accompanying drawings shall be interpreted as illustrative and not in a limiting sense.

I claim:
1. A method of manufacturing a multi-apertured magnetic device in which the magnetic material surrounding each aperture is capable of being selectively magnetized to either of two different senses of remanent magnetization to represent digital information, said method comprising the steps of:
   forming a slab of magnetic material that exhibits a substantially rectangular magnetic hysteresis characteristic and has parallel first and second planar surfaces;
   removing material in a plurality of identical patterns, each to a prescribed depth, from the first surface of said slab;
   removing material to a prescribed depth from said second surface in a plurality of patterns which are out of alignment with, but which overlap, patterns in said first surface, the sum of the prescribed depths to which the patterns are removed from said first and second surfaces being greater than the thickness of said slab resulting in the intersection of the patterns in said first and second surfaces, and the widths of each of said patterns in the first and second surfaces being substantially greater than spacing between adjacent ones of said patterns, to establish effective passageways within said slab in a plane substantially parallel to said slab surfaces.

2. A method according to claim 1, wherein the patterns in said first and second surfaces are formed by the steps of:
   cutting said first surface with a set of substantially parallel grooves extending in a first direction, and cutting said second surface with a set of substantially parallel grooves extending in a second direction, each of said grooves in the first and second surfaces having a width greater than the spacing between adjacent ones of said parallel grooves.

3. A method according to claim 1, wherein the patterns in said first and second surfaces are formed by the steps of:
   machining said first surface with substantially identical cavities at equidistant distinct locations, and
   machining said second surface with substantially identical cavities at equidistant distinct locations which are displaced in position with respect to the cavities in said first surface by a distance less than the cavity width.

4. A method according to claim 1, wherein the patterns in said first and second surfaces are formed by the steps of:
   machining said first surface in rows and columns of cylindrical cavities each having a diameter $d$, the axis of each cavity being spaced apart within said rows and columns by a distance less than $2d$, and
   machining said second surface in rows and columns of cylindrical cavities each having a diameter $d$, the axis of each cavity being spaced apart within said rows and columns by a distance less than $2d$, but displaced in position with respect to the cavities in the first surface by a distance less than $d$.

5. A method according to claim 4, wherein said cylindrical cavities are formed about axes orthogonal to said surfaces.

6. A method according to claim 4, wherein said cylindrical cavities are formed about axes parallel to said surfaces.

References Cited
UNITED STATES PATENTS
2,907,988  10/1959  Duinker _____ 340—174
3,134,964  5/1964  Wanlass _____ 340—174

JOHN F. CAMPBELL, *Primary Examiner.*

WHITMORE A. WILTZ, *Examiner.*

R. W. CHURCH, J. W. BOCK, *Assistant Examiners.*